United States Patent

[11] 3,628,920

| [72] | Inventor | James E. Barker |
| | | Freehold, N.J. |
| [21] | Appl. No. | 802,273 |
| [22] | Filed | Feb. 25, 1969 |
| [45] | Patented | Dec. 21, 1971 |
| [73] | Assignee | Cities Service Company |

[54] PREPARATION OF A CUPRIC HYDROXIDE-PHOSPHOROUS COMPLEX
13 Claims, No Drawings

[52] U.S. Cl. .................................................. 23/315,
                                                       23/147
[51] Int. Cl. ..................................................... C01g 3/00,
                                                       C01g 3/02
[50] Field of Search ........................................ 23/147, 315

[56] References Cited
UNITED STATES PATENTS
2,924,505   2/1960   Page, Jr. et al................   23/315

*Primary Examiner*—Oscar R. Vertiz
*Assistant Examiner*—Hoke S. Miller
*Attorney*—J. Richard Geaman ABSTRACT: Cupric hydroxide is prepared by mixing a copper sulfate solution, phosphoric acid and a solution of sodium hydroxide. The phosphoric acid is employed in an amount from about 0.05 to about 0.1 moles per mole of copper sulfate. The relative mixing rates are such that a pH of from about 10 to about 11.5 is maintained. The reaction temperature is maintained at less than 112° F., such as from about 85° F to about 110° F. The retention time of the reaction mixture in the reaction zone at such temperatures will generally be from about ½ minute to about 10 minutes. The reactants may be added to the reactor as three separate streams or, alternately, the phosphoric acid and copper sulfate may be premixed prior to addition to the reaction zone. The precipitate formed comprises the cupric hydroxide product, which is recovered as a cupric hydroxide-phosphorous complex having a bound phosphorous content of at least about 2 percent by weight calculated as $P_2 O_5$. This impure cupric hydroxide product, which has a very small particle size and a large surface area, is well suited for use as a fungicide.

PREPARATION OF A CUPRIC HYDROXIDE-PHOSPHOROUS COMPLEX

BACKGROUND OF THE INVENTION

1. Field of the Invention

This invention relates to the manufacture of cupric hydroxide. More particularly, it relates to an improved process for the manufacture of a cupric hydroxide product having fungicidal properties.

2. Description of the Prior Art

Various water insoluble copper salts have found widespread acceptance as fungicides for the treatment of various crops afflicted with fungus diseases. It has been recognized that copper in the form of cupric hydroxide, i.e., copper hydrate, is superior for such fungicidal purposes to copper in other forms, including cupric oxide and tribasic copper sulfate. The particle size and surface area of the compound also effects the fungicidal activity, with a small particle size and high surface area being generally required for effective fungicidal activity.

Various processes have been proposed for the manufacture of both pure cupric hydroxide and impure copper hydroxide products suitable for use as fungicides. In the process disclosed in the page U.S. Pat. No. 2,924,505, a copper hydrate-phosphorus complex fungicide is obtained. Page calls for the reaction of an aqueous solution of trisodium phosphate with an aqueous solution of copper sulfate to form a slurry, to which an aqueous solution of sodium hydroxide and an additional aqueous solution of copper sulfate is added. While this process produces a copper hydrate product that is suitable for use as a fungicide, the process is not without operational disadvantages, such as the requirement of a two-stage addition of copper sulfate. In addition, there is a continual desire in the art, of course, for the development of simplified procedures and techniques, especially those that permit additional economy in the cost of raw materials.

It is an object of the present invention to provide an improved process for the production of cupric hydroxide.

It is another object of this invention to provide an improved process for the production of a cupric hydroxide product having fungicidal properties.

With these and other objects in mind, the invention is hereafter set forth in detail, the novel features thereof being pointed out in the appended claims.

SUMMARY OF THE INVENTION

The objects of the present invention are accomplished by means of a process in which a cupric hydroxide product is produced by the reaction of copper sulfate, phosphoric acid and sodium hydroxide. These reactants are mixed at such a rate that the pH of the reaction mixture is maintained in the range of from about 10 to about 11.5. The reactants can be added to a reactor as three separate streams or, alternately, the copper sulfate and phosphoric acid may be mixed prior to being fed to the reactor. In either instance, the two-stage addition of copper sulfate referred to above is avoided.

Phosphoric acid will generally be employed in an amount within the range of from about 0.05 to about 0.1 moles per mole of copper sulfate. The reaction temperature is maintained at less than 112° F. in order to avoid decomposition of the product. At temperatures of from about 85° F. to about 110° F., the retention time of the reaction mixture in the reactor will generally be from about one-half to about 10 minutes. A longer retention time may be tolerated at reaction temperatures below about 85° F.

The cupric hydroxide product is obtained as an insoluble precipitate, while the byproduct trisodium phosphate and sodium sulfate are soluble in the liquid reaction mixture. The product may, therefore, be conveniently separated, washed and dried. The resulting impure copper hydrate product, having highly desirable fungicidal properties, comprises a cupric hydroxide-phosphorus complex having a bound phosphorus content of at least about 2 percent by weight, calculated as $P_2O_5$.

DETAILED DESCRIPTION OF THE INVENTION

In accordance with the present invention, an impure cupric hydroxide product is obtained by the mixture of a copper sulfate solution, phosphoric acid and a solution of sodium hydroxide. These reactants may be mixed in either a batch process of in a continuous operation. In one embodiment, the copper sulfate, the sodium hydroxide, and the phosphoric acid are added simultaneously to a reactor as three separate reactant streams. In another embodiment, the copper sulfate and the phosphoric acid may be mixed to form a premix that is added as a single reactant stream to the reactor, into which a separate sodium hydroxide stream is added.

The relative rates at which the reactants are fed to the reactor are such that the pH of the reaction mixture is maintained in the range of from about 10 to about 11.5. At a pH of less than about 10, it has been found that the intermediate product formed by the reaction of the phosphoric acid and the copper sulfate tends to remain in this form and is not converted, by reaction with sodium hydroxide, into the desired cupric hydroxide product. At a pH of about 12, on the other hand, it has been found that the product tends to decompose to the less desired copper oxide. Preferably, the pH is maintained at from about 10.5 to about 11.5.

It has been found that the desired control of the pH of the reaction mixture is facilitated by the continuous addition of copper sulfate, phosphoric acid and sodium hydroxide as provided in the present invention. While the amounts of the individual reactants employed does not constitute an essential feature of the present invention so long as the relative amounts are such as to maintain the desired pH range, it has generally been found that the amount of phosphoric acid employed is conveniently in the range of from about 0.05 to about 0.1 moles per mole of copper sulfate. It has also been found desirable to employ about 2 moles of sodium hydroxide per mole of copper sulfate, such as from about 1.75 to about 2.1 moles of sodium hydroxide per mole of copper sulfate employed.

At a temperature of about 112° F., the desired cupric hydroxide product decomposes to copper oxide. The temperature of the reaction mixture, or slurry, therefore, should be maintained at less than 112° F., conveniently in the range of from about 85° F. to about 110° F. Reaction temperatures lower than about 85° F. may also be employed although operation at such temperatures would generally be less desirable since refrigeration means would ordinarily be required in order to maintain such lower temperatures.

In addition to the decomposition that occurs if higher temperatures are employed, it has been found that the product tends, also, to decompose if the reaction mixture is retained in the reaction zone for extended periods of time. For this reason, the reactor size and the rate of reactant addition are desirably determined so as to provide a retention time in the reaction zone of from about one-half to about 10 minutes. Retention for longer periods of time at the more elevated end of the temperature range tends to result in an undesired decomposition of the product, although longer retention times may be maintained due to the lower decomposition rate at temperatures of about 85° F. or lower. After leaving the reactor, however, the product slurry has been found to be stable for at least three days.

The concentration of the reactants employed in the practice of the present invention is not a critical feature of the invention. The concentration of the reactants, to the contrary, appears to have little or no effect on the process of the product obtained. It has generally been found desirable, however, to employ a relatively dilute sodium hydroxide solution, as for example on the order of 10 percent by weight, in order to facilitate the maintaining of the reaction temperature within the desired limits. The concentration of the phosphoric acid may also be varied without significant effect on the process or product, with commercially available concentrations of phosphoric acid generally being satisfactory. An 85 percent phosphoric acid solution has been employed with advantage.

Similarly, any convenient copper sulfate concentration, such as a one molar solution, can conveniently be employed.

As indicated above, the process herein described produces a product slurry in which the cupric hydroxide is obtained as the insoluble solid reaction product. Separation of this product from the liquid reaction products may be carried out in any of the well-known, conventional equipment designed for decantation, centrifugation, or the like. In one embodiment of this invention, the product may conveniently be separated by withdrawing, continuously if desired, a portion of the product slurry from the reaction zone and feeding such withdrawn slurry to the conventional separation equipment employed. If the product is separated from the slurry by decantation, the resulting thickened slurry will generally be subjected to a filtration operation in order to recover the cupric hydroxide product.

The product recovered by any such conventional means is thereafter washed thoroughly to assure that it is free of caustic and is thereafter dried at temperatures of up to about 180° F. It has been found that at higher temperatures, the product tends to become unstable, resulting in the degradation of the product to one containing copper oxide. The thus recovered and treated product is stable and may be stored in the dry stage at temperatures up to about 180° F. If desired, the product may also be stored as a wet cake, preferably at temperatures up to 150° F. without conversion to copper oxide over relatively long periods of time.

The impure copper hydrate product has been found to comprise a stable cupric hydroxide-phosphorus complex having a bound phosphorus content of at least about 2 percent by weight calculated as $P_2O_5$. In many instances, the bound phosphorus content will be in excess of 4 percent by weight, and sometimes as high as about 6 percent. It has also been found that most of the phosphorus content of the reaction mixture is recovered in the cupric hydroxide-phosphorus complex. Relatively small amounts of phosphorus are found in the overflow from the decantation or thickener equipment used to separate a thickened product slurry from liquid reaction products. On filtration of this thickened slurry, the resulting filtrate has also been found to contain only a relatively small amount of phosphorus. Since the phosphorus is present in the impure cupric hydroxide product in bound form, it has likewise been found that the phosphorus is not significantly removed by the subsequent washing of the recovered product. Since the amount of phosphorus in the separated liquid products, in the filtrate, and in the wash water are all relatively small and insignificant, these streams may all be discharged to waste. This circumstance constitutes a further advantage of the present invention over various techniques in which the recovery of byproducts for recycle or other use is an essential feature for the economic feasibility of the process.

The cupric hydroxide product of the present invention, as shown by electron micrographs and surface area determinations by nitrogen absorption, are of very fine particle size and of high surface area. Generally, for example, the particle size of the product has been found to be less than about one micron. The product is thus highly suitable for use as a fungicide. For this purpose, the product may be dusted on the foliage to be treated or may be dispersed in water and sprayed over the foliage or crops to be treated.

In order to further illustrate the various features of the present invention, a series of runs is summarized in the table below. In these runs, the copper sulfate solution, the phosphoric acid, and the sodium hydroxide solution were added as separate streams in a continuous process for the production of cupric hydroxide. The variation in operating conditions are set forth in the table.

As shown in the table, the operating conditions should be controlled in order to assure against the undesired decomposition or conversion of the cupric hydroxide product to copper oxide. Thus, the pH of the reaction mixture should be maintained at less than 12.0, and the reaction temperature should be maintained at less than 112° F. If the reaction temperature is relatively high, e.g., over 90° F., it is desirable to provide a retention time of not larger than about 10 minutes, as significantly longer retention times will result in a decomposition of the desired cupric hydroxide-phosphorus product. In similar runs, the feasibility of premixing the phosphoric acid and the copper sulfate solution was established.

The present invention offers distinct advantages over the processes heretofore available for the production of cupric hydroxide. The present invention thus provides a simplified process involving relatively inexpensive materials. The process is subject to convenient control and is readily adaptable for continuous operations. The product obtained by the present invention is a stable product having highly desirable properties for use as a fungicide.

While the present invention has been described herein with reference to particular embodiments thereof, it will be appreciated by those skilled in the art that various changes and modifications can be made therein without departing from the scope of the invention as set forth in the appended claims.

Therefore, I claim:

1. A process for the production of a cupric hydroxide-phosphorus complex comprising:
   a. mixing a copper sulfate solution, phosphoric acid and a solution of sodium hydroxide in a reaction zone, at a temperature below about 112° F., the relative mixing rates of these reactants being such that the pH of the reaction mixture is maintained in the range of from about 10 to about 11.5; and
   b. separating the resulting cupric hydroxide-phosphorus complex precipitate from the reaction mixture, whereby a product cupric hydroxide-phosphorus complex having a bound phosphorus content of at least about 2 percent by

TABLE

| pH | Reaction temp. | Retention time (min.) | Molar ratio NaOH/$CuSO_4$ | Product analysis percent Cu | $P_2O_5$ | S | Stability at 100° F. (days) |
|---|---|---|---|---|---|---|---|
| \multicolumn{8}{c}{Effect on pH} |
| 10.0 | 88 | 5 | 1.79 | 59.1 | 4.6 | 0.03 | >4 |
| 10.9 | 91 | 5 | 1.75 | 59.19 | 4.0 | 0.11 | >4 |
| 11.5 | 94 | 5 | 1.75 | 58.90 | 3.7 | 0.06 | >4 |
| 12.0 | 90 | 5 | 1.75 | Product decomposes | | | |
| \multicolumn{8}{c}{Effect of temperature} |
| 10.9 | 91 | 5 | 1.80 | 59.2 | 4.0 | 0.11 | >4 |
| 11.3 | 94 | 5 | 1.80 | 58.9 | 3.7 | 0.06 | >4 |
| 10.5 | 105 | 5 | 1.80 | 59.2 | 3.5 | 0.16 | >4 |
| 10.5 | 109 | 5 | 1.80 | 59.2 | 3.1 | 0.07 | >4 |
| 10.5 | 112 | 5 | 1.77 | Product decomposes | | | |
| \multicolumn{8}{c}{Effect of retention time} |
| 11.1 | 90 | 2 | 1.75 | 59.5 | 3.3 | 0.04 | >4 |
| 10.9 | 91 | 5 | 1.75 | 59.2 | 4.0 | 0.11 | >4 |
| 10.5 | 93 | 10 | 1.75 | 59.5 | 3.3 | 0.05 | >4 |
| 10.9 | 93 | 20 | 1.75 | Product decomposes | | | | weight, calculated as $P_2O_5$, and having fungicidal properties, is obtained.

2. Process for reacting copper sulfate, sodium hydroxide and phosphoric acid to prepare a cupric hydroxide-phosphorus precipitate comprising:
   a. mixing, in a one-step operation, a copper sulfate solution, from about 0.05 to about 0.1 mole of phosphoric acid per mole of copper sulfate and from about 1.75 to about 2.1 moles of sodium hydroxide per mole of copper sulfate, and
   b. minimizing decomposition of the cupric hydroxide-phosphorus complex by
      1. maintaining the temperature of the reaction mixture at less than 112° F.,
      2. maintaining the pH of the reaction mixture from about 10 to about 11.5, and
      3. retaining the reaction mixture in the reaction zone from about one-half to about 10 minutes, the retention time being generally inversely proportional to the reaction temperature.

3. The process of claim 2 in which said copper sulfate, phosphoric acid and sodium hydroxide are mixed as continuous streams.

4. The process of claim 3 in which the separation of cupric hydroxide-phosphorus complex precipitate from the reaction mixture comprises withdrawing from the reaction zone a slurry comprising said precipitate in liquid reaction products and thereafter separating said cupric hydroxide-phosphorus complex from said liquid reaction products.

5. The process of claim 4 in which the slurry withdrawn from the reaction zone is passed to a slurry thickening zone from which wet cupric hydroxide-phosphorus complex product is withdrawn.

6. The process of claim 5 in which the cupric hydroxide-phorphorus complex product is thereafter filtered, washed and dried.

7. The process of claim 2 in which the temperature of the reaction mixture in said reaction zone is maintained at from about 85° F., to about 110° F.

8. The process of claim 2 including the initial mixing of said copper sulfate and phosphoric acid to form a premix and mixing said premix with the solution of sodium hydroxide in said reaction zone.

9. The process of claim 8 in which said premix and said sodium hydroxide are mixed as continuous streams.

10. The process of claim 8 in which the amount of phosphoric acid employed is from about 0.05 to about 0.1 moles per mole of copper sulfate.

11. The process of claim 8 in which the temperature of the reaction mixture in said reaction zone is maintained at from about 85° F. to about 110° F.

12. The process of claim 11 in which the retention time of said reaction mixture in the reaction zone is from about one-half minute to about 10 minutes.

13. The process of claim 9 in which the separation of cupric hydroxide-phosphorus complex precipitated from the reaction mixture comprises withdrawing from the reaction zone a slurry comprising said precipitate in liquid reaction products and thereafter separating said cupric hydroxide-phosphorus complex from said liquid reaction products.

* * * * *